June 6, 1944. R. G. JACKSON ET AL 2,350,356
MACHINE FOR EXTRUDING LOADED COMPONENTS
Filed March 10, 1943 3 Sheets-Sheet 2
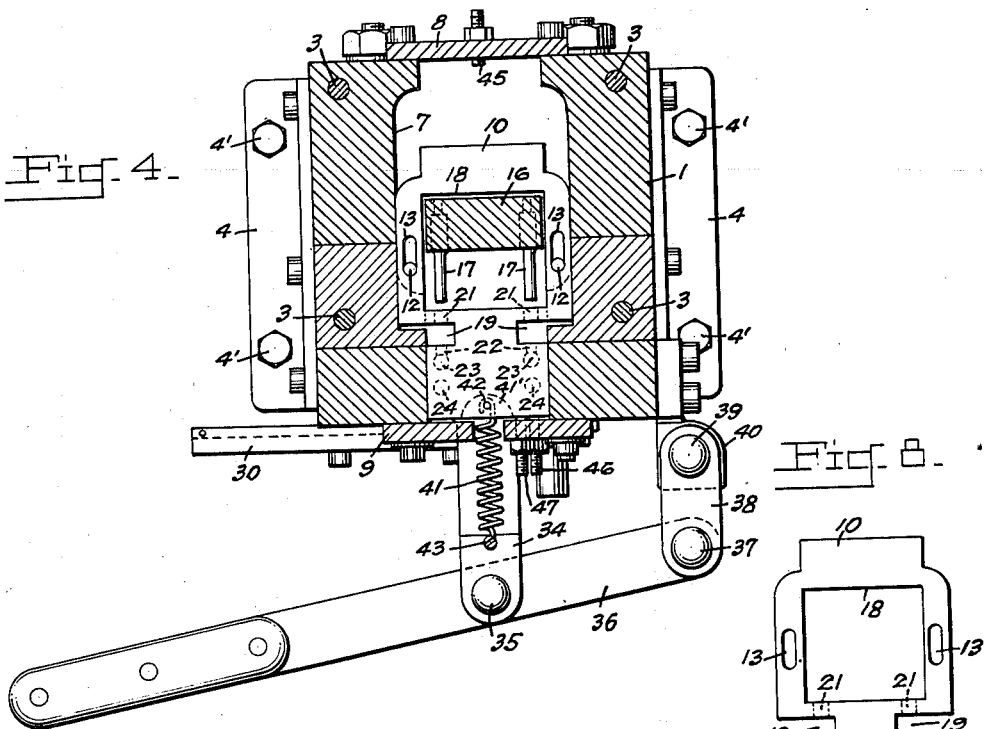
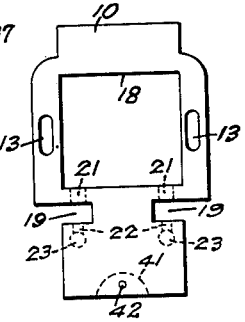
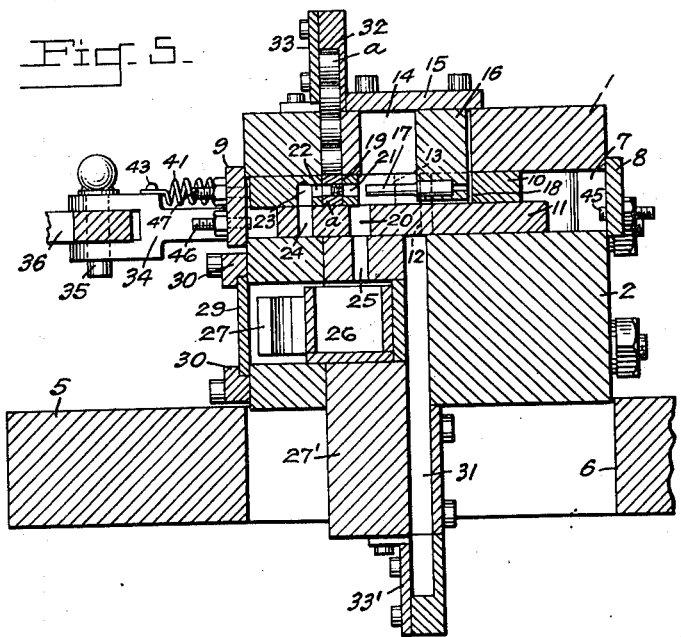
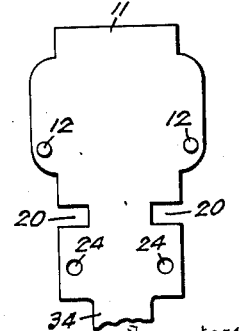
Inventors
Robert G. Jackson
Atwood H. Grover
By C.E. Herrstrom & H.E. Thibodeau
Attorneys June 6, 1944.     R. G. JACKSON ET AL     2,350,356
MACHINE FOR EXTRUDING LOADED COMPONENTS
Filed March 10, 1943     3 Sheets-Sheet 3
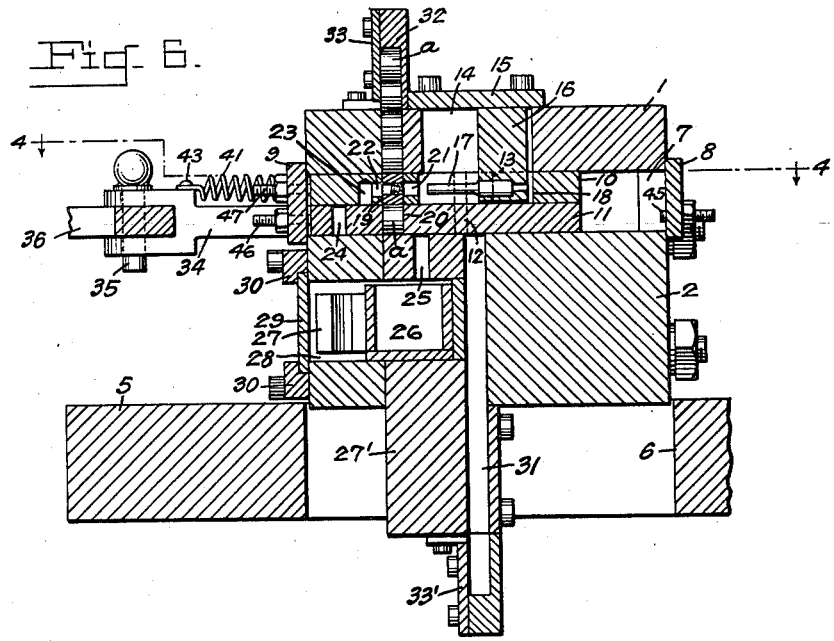
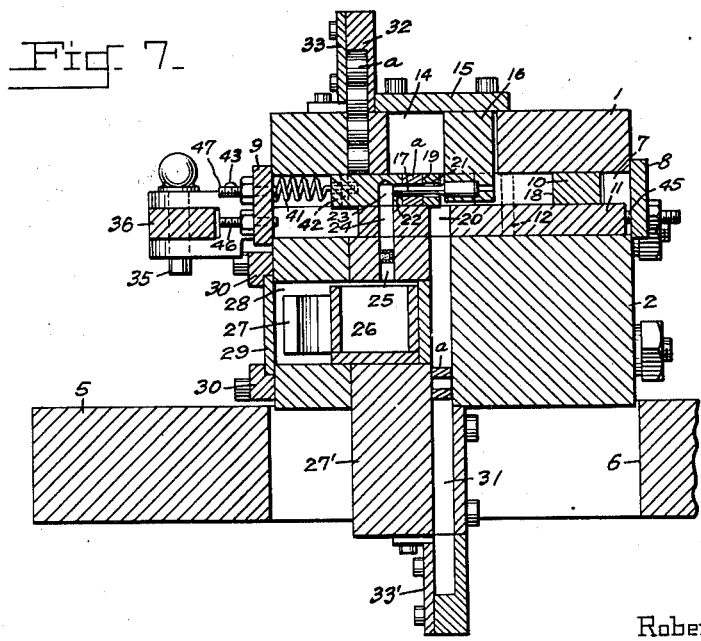
Inventors
Robert G. Jackson
Atwood H. Grover
By C.E. Herrstrom & H.E. Thibodeau
Attorneys Patented June 6, 1944

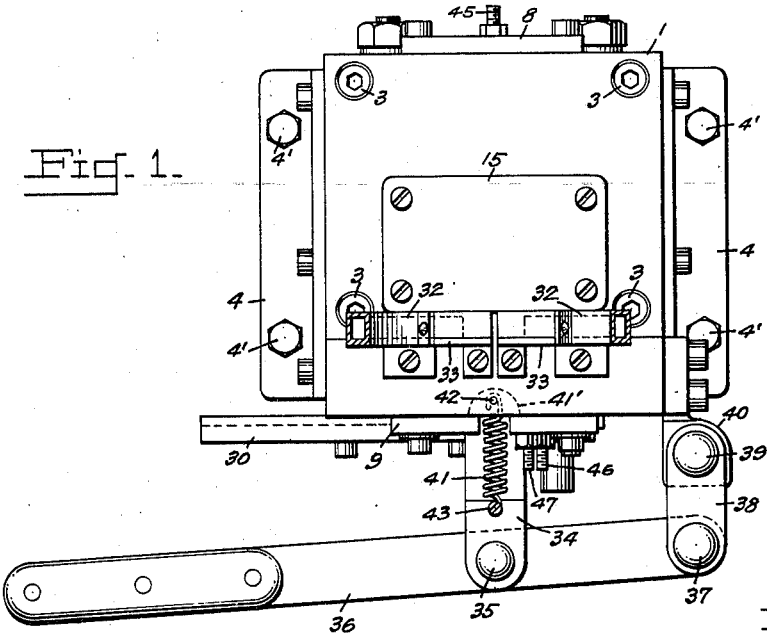

2,350,356

UNITED STATES PATENT OFFICE 2,350,356

MACHINE FOR EXTRUDING LOADED COMPONENTS

Robert G. Jackson, Hopatcong, and Atwood H. Grover, Rockaway, N. J.

Application March 10, 1943, Serial No. 478,658

7 Claims. (Cl. 86—1)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a machine for extruding loaded ammunition components, such as detonating caps from loading sleeves or cylinders.

According to the present practice a loading "fixture" or simple machine is employed in which the loading sleeve containing an unloaded cap is placed. The cap is then loaded, and thereafter the sleeve and its contained loaded cap is removed from the fixture. In the operation of loading the cap, very considerable pressure is necessary in order to pack or consolidate the explosive to the proper density. The application of this force causes such a tight fit between the loading sleeve and cap, that considerable pressure is required to remove the cap. Aside from this, there is some danger incident to the cap removal, and therefore one of the principle objects of this invention is to provide a machine in which the cap extruding operation is performed in an expeditious manner and so that the chances of mishap are reduced to a minimum, and the loaded components themselves are protected from communicated explosions.

Another object is to increase production and facilitate the customary inspection and packing of the finished or loaded component.

The machine generally comprises a metal body made up of strong and separable parts, including chutes into which the loading sleeves with their contained caps, are fed, and through which they fall by gravity to slide, transfer, and extruder mechanisms, the operations being in an isolated area in which the elements operated upon are separated from each other, and the operator protected from personal injury.

In the drawings:

Fig. 1 is a top plan view of the machine.

Fig. 2 is a front elevation.

Fig. 3 is a detail front elevation of a plate or closure for the front of the channel for the reciprocable slides, and holder for the front stops for the slides.

Fig. 4 is a cross section taken about on the line 4—4 of Figure 6.

Fig. 5 is a vertical section taken on the line 5—5 of Figure 2.

Fig. 6 is a similar section showing the slides in their extreme forward position, and their relation in that position, to the stationary extruders.

Fig. 7 is a view similar to Figure 6, showing the slides in extreme backward position when a loaded component has just been extruded from its sleeve and on its way to the drawer or receptacle positioned to receive it, and a sleeve from which the detonator was extruded on a former operation, on its way out of the offset portion of the sleeve chute.

Fig. 8 is a plan of the top slide.

Fig. 9 is a similar view of the bottom plate.

Referring particularly to Figures 1 and 2, the numeral 1, designates the upper body portion of the machine bolted to the base 2, by bolts 3. The base is provided with side flanges 4 apertured for the passage of bolts 4', by which the machine may be conveniently secured rigidly to a bench or table 5. There is an opening 6, through the table to accommodate the offset delivery ends of the sleeve chutes and part of the frame that supports the drawer or receptacle that receives the detonator caps after they have been extruded from the sleeves, which parts will be presently described more in detail.

In order to increase production certain parts of the machine, such as the chutes and extruders are duplicated, and the slides and slide channel are widened so that two loading sleeves and their contained loaded components can be operated upon simultaneously when the machine is working at full capacity, the construction however, being such that the mechanism will function equally well when the operations are confined to one side of the machine.

The base 2, has a central cavity forming with the top plate 1, a channel 7 extending from the front of the machine to the back. This channel is closed at the back by a plain plate 8, and partially closed at the front by a recessed plate 9, Figure 3. Operating in the channel are two slides 10 and 11, the slide 10, being superimposed upon the slide 11. The lower slide is provided with oppositely disposed pins or studs 12, Figures 4 and 9, which when the slides are in operative relation, extend through slightly elongated slots 13, in the upper slide, so that the slides may move independently of each other for a distance controlled by the length of the slots, as well as in unison in the cap extruding and loading sleeve transfer operations.

There is a recess 14, Figures 5–7, in the plate 1, covered by a cover 15 bolted to the plate and carrying a depending block 16, in which are mounted the horizontally and oppositely disposed etxruders 17, these being stationary and the slides 10 and 11 slidable relative to them.

To enable the top slide to move relative to the extruders it is provided with a rectangular opening 18, Figure 8. This slide is further provided, in advance of the opening 18, with two oppositely positioned recesses 19, which register, at times, with similar recesses 20, in the lower slide 11, Figure 9, to form openings for the reception of and passage through the slides of the loading sleeves $a$. The front wall of the opening 18, is provided with cylindrical holes 21, which are opposite similar holes 22, laterally entering bores 23, in the upper slide, the laterally drilled holes being for the passage of the ends of the extruders 17, as best shown in Figures 5—7.

The lower slide 11, has two cylindrical openings 24, which register at times, with the lower ends of the bores 23 in the upper slide, the two bores 23, which may extend entirely through the slide 10, and the two openings 24, form, when in registry, a passage through the two slides through which the detonator caps pass after they have been extruded from the sleeves $a$, Figures 5 and 7. Sometimes the bores 23 and openings 24 are in registry and at the same time in registry with the openings 25, in the floor of the slide channel 7, so that the extruded detonators can pass freely to the drawer 26, conveniently provided with a handle 27. The drawer is supported on a member 27' above which there is a recess 28 for its reception, which recess is kept closed by a door 29, sliding in grooves in the upper and lower faces of bars 30, bolted to the front of the machine.

As stated the recesses 19 in the upper slide at times register with the recesses 20 in the lower slide, and at some of their times of registry, they will register with the upper end of the passage 31, which opens into the floor of the slide channel 7, so that the empty sleeves may pass out of the machine. The openings 31, may be considered as an offset portion of the chutes 32, since in the operation of the slides the empty sleeves are transferred from the chute 32 to said openings. As best shown in Fig. 1, the upper parts of the chutes are supported by flanged plates 33, bolted to the top of the machine and circular plates 33' bolted to the member 27', support the outlet portions of the chutes.

The lower slide 11, has a forward extension 34, bifurcated at its end for pivotal connection at 35 to the operating lever 36 pivoted at 37 to a link 38, which in turn is pivoted at 39 to a rigid support 40 bolted to the side of the machine. The slide 10 is connected to the extention 34, of slide 11, by a spiral spring 41, one end of which is hooked around a pin 42 in a recess 41' in the upper slide, the other end of the spring being connected at 43, to the bifurcated end of the extension 34.

A threaded stop 45 is in the rear plate 8, adjustable to regulate to a nicety the rearward movement of the lower slide, and a similar stop 46, is carried by the front plate 9, which plate also carries a stop 47, for the upper slide 10, and it is against this stop that the spring 41, holds the upper slide when it is in its extreme forward position to assure the accurate registry of the openings 24, and bores 23, in one of their registering positions, or that shown in Figure 5. This spring is always under tension with a tendency to draw the upper slide forward to the limit permitted by the pins 12, in slots 13, of said slide, hence the only positions of the slides, in which the pins are in the front ends of the slots, are the positions shown in Figures 4 and 6, the positions of the pins being shown in dotted lines in these figures, and also Figure 7. In explaining the operation of the machine, the positions of the parts as shown in Figure 6, may be taken as a starting point:

An empty sleeve $a$, or maybe one from which the cap has been extruded in the preceding operation, is in position to be carried toward the passage 31. When the lever 36 is moved toward the front of the machine, the lower slide 11 will be moved toward the rear of its channel 7, with no movement, as yet, of the upper slide 10, but when the pins 12 on the lower slide reach the rear ends of the slots 13 in the upper plate, both slides will move rearwardly together, the lower slide in response to the positive action of the lever 36, and the upper slide in response to the now positive force exerted by the pins 12, in the far ends of the slots 13, the upper slide meanwhile being urged toward the front of the machine by the spring 41. In the initial movement of the slides and when the pins reach the far ends of the slots, the relation of the upper and lower slides will be such that the bores 23 in the upper slide will be in registry with the holes 24 in the lower one, so that caps extruded from the sleeves can fall into said holes, where they will remain, supported by the floor of the slide channel 7, preparatory to being carried backward by the lower slide, which is now, by reason of their slot and pin connections, coupled to the upper slide. This rearward movement of both slides will carry the empty sleeves $a$ in the lower slide and the loaded sleeves directly above them, backward toward the extruders 17. When the upper slide moves sufficiently, or effectively rearwardly, the caps will be extruded and carried to the bores 23, which at this time will be in registry with the holes 24 in the lower slide, and the holes 24 will be in registry with openings 25 in the floor of the slide channel, as shown in Figure 7. In the meantime the empty sleeves 2 which have been riding in the recesses 20 in the lower slide, will be brought to and be delivered into the upper ends of the offset passages 31, leading out of the machine. Obviously upon the return of the operating lever to normal position, all the parts, will be restored to the position shown in Figure 6, with the upper slide held in contact with the stop 47 by the spring 41, and the pins 12, again in the forward ends of the slots 13.

We claim:

1. In a machine for extruding ammunition components from loading elements, in combination, reciprocable slides having openings therein, the openings in one slide being for the reception of the loading element before the extrusion of the component, and the openings in the other slide being for the passage of the empty loading element and the extruded component, means for reciprocating the slides to bring their openings into and out of registry, and means for extruding the component from the loading element.

2. In a machine for extruding ammunition components from loading elements, in combination, upper and lower reciprocable slides, the upper slide having a through opening to receive said element before the component has been extruded, the lower slide having a similar opening for the passage of said element after the component has been extruded, means for reciprocating the slides to bring their openings into and out of registry, extruding means positioned to extrude the component from the loading element upon the effective movement of the upper slide toward said means.

3. A machine for extruding ammunition components from loading elements, in combination, upper and lower reciprocable slides, the upper slide having a through opening to receive the loading element before the component is extruded and a bore for the reception of the component after extrusion, the lower slide having an opening for the reception of the empty loading element and a passage to receive the component, means for actuating the slides to bring the bore and opening in the upper slide into registry with the opening and passage in the lower slide to permit the passage of the component and loading element through the slides, and means for exturding the component while in the upper slide.

4. A machine for extruding ammunition components from loading elements, comprising a body having a slide channel therein and a chamber opening into said channel and also openings in the floor of the channel, reciprocable upper and lower slides in the slide channel and arranged for joint and independent movement relative to each other, the upper slide being provided with a through opening for the reception of the loading element before the component is extruded and a bore to receive the component after it has been extruded, the lower slide being provided with a through opening to receive the empty loading element, and a passage for the extruded component, means for reciprocating the slides to bring their openings into and out of registry and into and out of registry with the openings in the floor of the slide channel, and extruding means in the chamber positioned to extrude the component from the loading element upon the effective movement of the upper slide toward said means.

5. In a machine for extruding ammunition components from loading elements, in combination, a body having a slide channel therein, two slides in said channel, one of which is provided with an elongated slot and the other with a pin extending into said slot whereby in certain movements of the slides one slide is enabled to move independently of the other, both slides having openings therethrough brought into and out of registry by the movement of the slides relative to each other, the opening in one slide being for the reception of the loading element before extrusion of the component, and the opening in the other slide being for the reception and thereafter the passage of the empty element, means for reciprocating the slides, and extruding means positioned to extrude the component upon the effective movement of one of the slides toward said means.

6. In a machine for extruding components from loading elements, in combination, two slides, one being provided with a slot and the other a pin extending into the slot to limit the extent of independent movement of the slides, openings in the slides brought into and out of registry for the purpose set forth, yielding means connecting the two slides and cooperating with the slot and pin connections between the slides to hold the slides in a position wherein the openings in the slides will be such as to prevent the passage through the slides of a loaded component and an empty loading element, means for extruding the component from the loading element upon the actuation of the slides, and means for reciprocating both of said slides.

7. In a machine for extruding ammunition components from loading elements, in combination, upper and lower reciprocable slides arranged for joint and independent movement relative to each other, openings through the slides, adapted to be brought into and out of registry, the openings in one slide being for the reception of the loading element before the component is extruded therefrom, and an opening in the other slide for the passage of the empty loading element when the two openings are brought into registry, means for extruding the component while in the upper slide, and means for reciprocating both slides.

ROBERT G. JACKSON.
ATWOOD H. GROVER.